(No Model.)
A. BETTELEY.
PULLEY.
No. 360,989. Patented Apr. 12, 1887.
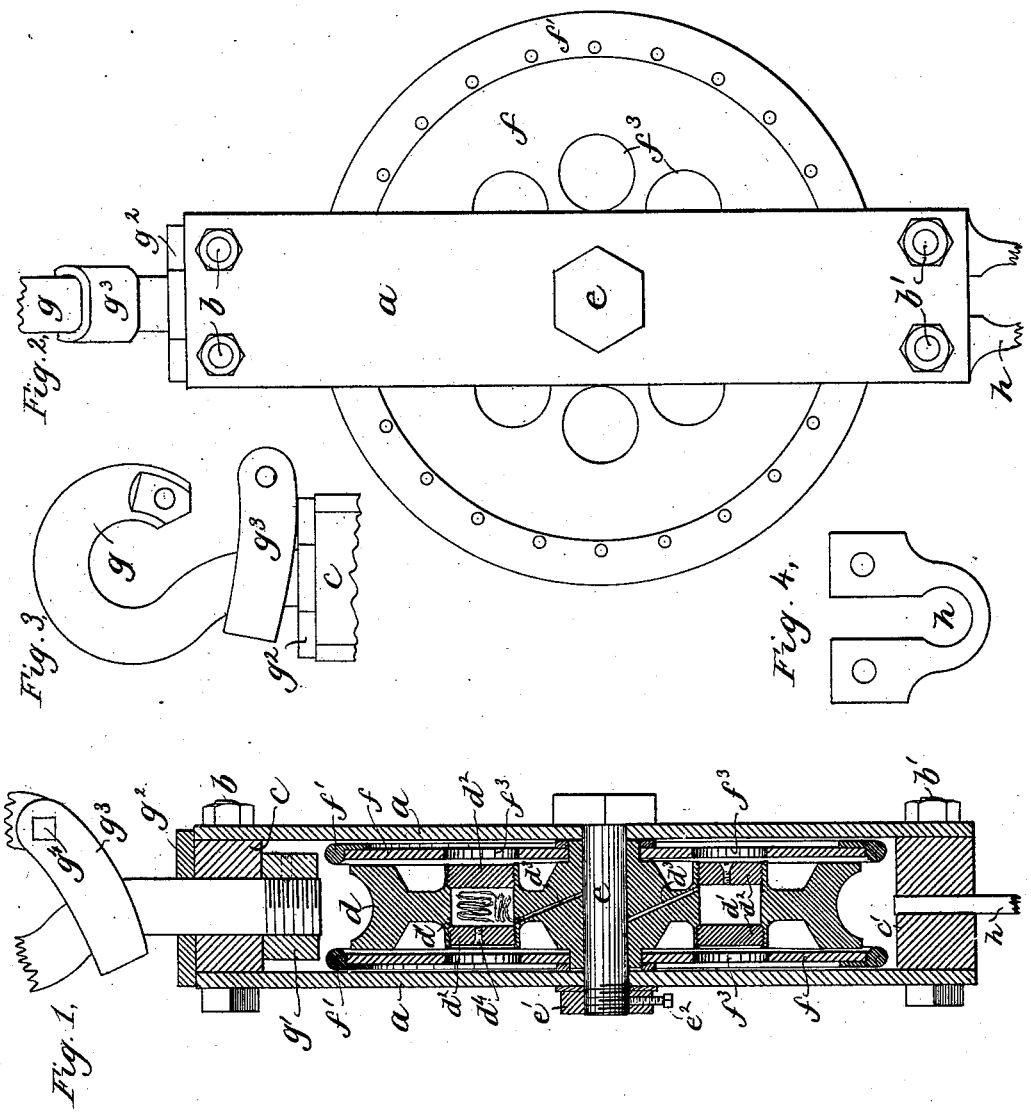
Witnesses,
Jas. J. Maloney.
M. E. Hill.
Inventor,
Albert Betteley
By Jos. P. Livermore
Att'y.

UNITED STATES PATENT OFFICE.

ALBERT BETTELEY, OF BOSTON, MASSACHUSETTS.

PULLEY.

SPECIFICATION forming part of Letters Patent No. 360,989, dated April 12, 1887.

Application filed November 26, 1886. Serial No. 219,913. (No model.)

*To all whom it may concern:*

Be it known that I, ALBERT BETTELEY, of Boston, county of Suffolk, State of Massachusetts, have invented an Improvement in Pulley-Blocks, of which the following description, in connection with the accompanying drawings, is a specification, like letters on the drawings representing like parts.

My invention is embodied in a pulley-block that is especially adapted for use in connection with wire ropes for hoisting heavy weights, although it may be used with any kind of ropes or rigging if desired.

The pulley is of very simple and inexpensive construction and of great strength in proportion to its size and weight; and the invention consists, mainly, in novel appliances for lubricating the bearing of the sheave or wheel and in devices for preventing the rope from chafing in case it does not "lead fair" from the pulley, and in other details of construction hereinafter pointed out.

Figure 1 is a longitudinal section of a pulley-block embodying this invention. Fig. 2 is a side elevation thereof, and Figs. 3 and 4 details to be referred to.

The invention is shown embodied in a single sheave-block; but it is obvious that any number of sheaves may be used without changing the essential construction or mode of operation of the parts.

The frame of the pulley is composed of side bars, $a$, which may be cut to a proper length from bar iron or steel, and are fastened at their ends by bolts $b\ b'$ to end pieces, $c\ c'$, which hold the said side pieces, $a$, at the proper distance apart to receive the wheel or sheave $d$ between them. The said sheave may be of cast metal, and has its bearing on the shank of a bolt, $e$, that passes through suitable openings in the side bars, $a$, and is securely held by a nut, $e'$, that is prevented from unscrewing by a fastening device, $e^2$. The grooved periphery of the sheave $d$ is considerably narrower than the space between the side bars, $a$, of the block-frame, as shown; but the hub portion of the sheave is of the full width of said space, thus affording a large bearing-surface on the bolt $e$.

In order to prevent the rope from working out from the groove of the sheave and from chafing against the frame of the block, the latter is provided with movable guard-plates $f\ f$, preferably hung loosely on the hub portion of the sheave, as shown in Fig. 1, but capable of turning independently of the said sheave. The said guard-plates $f\ f$ are of larger diameter than the sheave $d$, projecting beyond the periphery of the said sheave, and are provided around their periphery with a band, $f'$, of soft metal—such, for instance, as brass—which may be rounded, as shown, so as to have no tendency to cut the rope if it draws somewhat out of line with the plane of the sheave across the edge of the guard-plate.

In order to lubricate the bearing of the sheave, the web between the hub and grooved edge of the wheel is provided with recesses $d'$, as many as may be required, which are cylindrical and have their axes at right angles to the plane of rotation of the sheave, and are threaded at their ends to receive caps or plugs $d^2$, that are screwed tightly into the ends of the said recesses, thus forming of each recess a tight lubricant-chamber, which may be filled with oil or any desired lubricating material. Oil-passages $d^3$ extend from said chambers to the bore of the hub for conveying the lubricant to the bearing-surface, and the said passages will preferably contain wicking or other fibrous material, which may also be placed loosely in the lubricant-chambers to convey the lubricant by capillary action to the bearing-surface. The inlet ends of the passages $d^3$ in the lubricant-chambers are so arranged that they can be controlled by screwing the heads $d^2$ in or out a short distance, so as to regulate the flow of lubricating material to the bearing-surface, and one of the heads $d^2$ of each lubricant-chamber is preferably provided with an inlet-opening, which may be stopped by a screw, $d^4$, said opening being used for the introduction of the lubricant without removing the entire head $d^2$.

The guard-plates $f$ are preferably provided with one or more openings, $f^3$, which serve to lighten the said plates and also afford access to the lubricating-chambers, which will hold a supply of lubricant sufficient to keep the block lubricated for a very long time—a matter of great importance with a block that may be used in some part of the rigging difficult of access.

The supporting-hook $g$ of the block may be made of a piece of rod of the proper diameter, bent to the proper shape, and having its shank threaded and passed through an opening in the end piece, $c$, of the frame, as shown in Fig. 1, the shank of the hook having a large nut, $g'$, screwed upon it, and secured by a set-screw or otherwise, so as to support the weight of the pulley-block, while permitting the same to swivel on the hook. A shallow nut, $g^2$, may be screwed upon the shank of the hook $g$ before the latter is attached to the pulley-block, and serves to prevent the shank from dropping down, so as to come in contact with the rope on the sheave. A strap, $g^3$, shaped to fit the shank of the hook $g$ and extend from the said shank to the end of the hook, may be fastened to the end of the hook by a bolt, $g^4$, thus adding greatly to the strength of the hook and preventing it from straightening under a great strain, and also serving as a mousing to prevent the part engaged with the hook from escaping therefrom. The other end of the block is shown as provided with an eye, $h$, to which the standing end of the rope may be fastened, the said eye being held by the bolts $b'$ and being forked where it enters the block-frame, so that it may, if desired, be placed over a ring or through a loop by removing one or both of the bolts $b'$ and subsequently replacing them.

By having the guard-plates $f$ at the sides of the sheave $d$ free to turn, instead of having the shell or side plates of the frame of the block operate to keep the rope in the groove, the wear of the rope will be greatly diminished, as in case the rope should lead somewhat out of line with the block it will draw across the soft-metal edge of one of the plates $f$, which will turn with the rope instead of having the latter chafe against a stationary piece, as takes place in blocks of usual construction.

As the guard-plates in the greater part of the use of the block do not come in contact with the rope, they will, although of softer material, wear nearly if not quite as long as the remainder of the block; but if they should become too much worn, while the remainder of the block is in good condition, they may be readily replaced, and, being of soft material, they will not cut or injure the rope when it occasionally runs over them. This is of especial advantage in connection with wire rigging, as the wearing out and breaking of one or two of the wires of the rope makes a very serious defect in the rope.

A block of this construction is very inexpensive, as no forging is required, the parts being all made of metal just as it comes from the rolling-mills; and it is also very light in proportion to its size and strength, so that a sheave of large diameter may be employed, and the bend in the rope will be of comparatively small curvature, which is a matter of considerable importance when wire rope is used.

I claim—

1. A pulley-block comprising a frame and sheave, the web of said sheave being provided between its hub and periphery with one or more transverse hollow cylindrical projections closed at one end and provided with plugs at the other, forming lubricant-chambers that communicate with the bearing-surface and lie wholly between the hub and grooved periphery of the sheave, substantially as and for the purpose described.

2. In a pulley-block, the combination of a supporting-frame and sheave with guard-plates provided with soft-metal bands at either side of the said sheave, projecting beyond the periphery of the said sheave and capable of having a rotary movement, substantially as and for the purpose described.

3. The combination of the block-frame and sheave with a hook supporting the said block and a strap extending around the shank and to the end of the said hook, and a bolt connecting the said strap and the end of the hook, substantially as and for the purpose described.

4. In a pulley-block, the combination of a supporting-frame provided with an axle-pin, and a sheave having a hub with an internal bearing on said axle-pin and an external bearing at either end, and guard-plates supported on the said external bearings of the hub and projecting beyond the periphery of the sheave, substantially as described.

5. A pulley-block comprising a frame and sheave, the web of the said sheave being provided between its hub and periphery with one or more transverse cylindrical openings threaded at their ends, combined with plugs screwed into either end of the said openings, forming a tight chamber between them, and an oil-passage extending from the said chamber to the bearing-surface of the sheave, having its mouth in the chamber controlled by one of the said plugs, substantially as and for the purpose described.

In testimony whereof I have signed my name to this specification in the presence of two subscribing witnesses.

ALBERT BETTELEY.

Witnesses:
 JOS. P. LIVERMORE,
 JAS. J. MALONEY.